July 22, 1969 A. G. SAMUSENKO 3,457,455

FERROELECTRIC CONTROL CIRCUITS

Filed May 20, 1965

INVENTOR.
ANATOL G. SAMUSENKO

BY

Samuel Cole

Attorney

United States Patent Office 3,457,455
Patented July 22, 1969

3,457,455

FERROELECTRIC CONTROL CIRCUITS

Anatol G. Samusenko, Princeton, N.J., assignor to RCA Corporation, a corporation of Delaware Filed May 20, 1965, Ser. No. 457,273
Int. Cl. H05b 37/02
U.S. Cl. 315—176 8 Claims

ABSTRACT OF THE DISCLOSURE

Two ferroelectric elements which can be made to exhibit a high or a low impedance in circuit with a load such as an electroluminescent cell. A non-linear bypass circuit is connected in shunt with the load. In one condition of the two ferroelectric elements, the bypass circuit exhibits a low impedance and in the other condition of the two ferroelectric elements, the bypass circuit exhibits a high impedance.

The present invention relates to ferroelectric control circuits which are useful in ferroelectric electroluminescent panel-type displays, such as mural television displays, in ferroelectric memories, and in other ferroelectric storage and control circuits.

When an electric field is applied to a ferroelectric material, the material exhibits a relationship between the polarization of its "bound charge" and the applied field in the general form of the hysteresis loop exhibited by ferromagnetic materials. "Bound charge" refers to the electric dipoles in the material. By utilizing the ferroelectric material as the dielectric of a capacitor, this hysteresis effect can be employed for the storage of binary information, for the control and switching of electric signals, and for other purposes.

A well-known ferroelectric control circuit, termed a "transcharger," which is useful in panel-type displays and elsewhere, is described in detail in Rajchman et al. Patent No. 2,900,622, issued Aug. 18, 1959. One arrangement of a transcharger shown in the patent includes three ferroelectric elements, two of which are essentially in series with an alternating voltage source and a load, such as an electroluminescent element. The third ferroelectric element is coupled between the common connection of the first two ferroelectric elements and the setting and resetting pulse circuits. In one condition of the transcharger, the two series-connected ferroelectric elements are polarized in opposite directions and "block" the transcharger. In the other condition of the transcharger, the two series-connected ferroelectric elements are polarized in the same direction and "unblock" the transcharger.

In the operation of a circuit such as discussed above, in one condition of the series-connected ferroelectric elements, the alternating voltage which develops across the load should be relatively high and, in the other condition of these elements, this voltage should be reduced to an insignificant value. But, in practical circuits, it is found difficult to reduce the minimum voltage which develops across the load to as low a value as desired. In the case of an electroluminescent load element, for example, the minimum voltage is still sufficient to produce light output of low intensity. This reduces the contrast ratio, defined as the maximum light intensity divided by the minimum light intensity, which it is possible to obtain from the electroluminescent element.

In the circuit of the present invention, the minimum voltage across the load is reduced by a non-linear by-pass circuit in shunt with the load. In one condition of the series connected ferroelectric elements, the by-pass circuit acts like a very low value of impedance compared to the load impedance. In the other condition of the series connected ferroelectric elements, due to the non-linear nature of the by-pass circuit, it appears like a relatively high value of impedance compared to the load impedance. Therefore, a voltage develops across the latter and the load which is not greatly different from the voltage which would develop across the load in the absence of the by-pass circuit.

The invention is discussed in greater detail below and is shown in the accompanying drawings, of which:

FIGURE 1 is a block circuit diagram of a prior art transcharger circuit;

FIGURES 2*a* and 2*b* are somewhat idealized hysteresis loops of the series-connected ferroelectric elements FE–1 and FE–2 of FIGURE 1;

Throughout the figures, similar reference numerals and characters are applied to similar parts.

Figure 1:
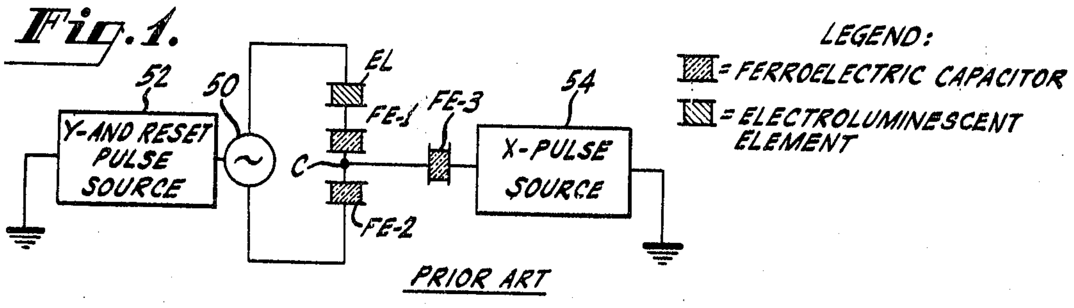

The circuit of FIGURE 1 is an improved form of transcharger which is described in detail in copending application Ser. No. 328,090, now Patent No. 3,197,744, filed Dec. 4, 1963, by Bernard J. Lechner and assigned to the same assignee as the present application. The circuit includes an alternating voltage source 50 connected across the essentially series-connected electroluminescent element EL and ferroelectric elements FE–1 and FE–2. An X pulse source 54 is connected at one terminal to a point of reference voltage, such as ground, and at its other terminal through a third ferroelectric element FE–3 to the common junction C between the ferroelectric elements FE–1 and FE–2. The three ferroelectric elements may be of the same capacitance. A Y and reset pulse source 52 is connected between ground and the alternating voltage source 50.

A detailed discussion of the operation of the circuit of FIGURE 1 appears in the copending application above. In brief, when the reset pulse source 52 applies a relatively large amplitude pulse to the circuit, the ferroelectric elements FE–1 and FE–2 become oppositely polarized and block the circuit. In this condition of the circuit, the elements FE–1, FE–2 present a high impedance to source 50 and very little of the source voltage develops across the electroluminescent element EL. When the X pulse source 54 and Y pulse source 52 apply coincident pulses of opposite polarity to the circuit, the ferroelectric elements FE–1 and FE–2 become polarized in the same direction, thereby placing the circuit in the unblocked condition. In this condition, the two ferroelectric elements FE–1 and FE–2 present a low impedance to the source 50 and a substantial voltage develops across the electroluminescent element EL.

In the circuit of FIGURE 1, the X pulse source is of low internal impedance, and the source 50 is connected to ground at an appropriate point in its circuit so that the "bridge" 50, EL, FE–1, FE–2 is balanced. The point C therefore remains essentially at ground, both during the blocked and unblocked condition of the circuit. It is because of this that there is little tendency for the alternating source 50 spuriously to block or unblock the transcharger circuit.

As mentioned above, FIGURE 1 is a simplified showing. If desired, a second load element, such as a second electroluminescent element, may be employed in series with the second ferroelectric element FE–2, as shown in FIGURE 1 of the copending application. In a circuit of this type, the source 52 may be connected to the center tap of the source 50, as discussed in the application, to maintain the bridge in perfect balance. Or, a circuit may be employed such as shown in FIGURE 6 of the application. In the latter case, it is desirable to connect source 52 to a terminal of source 50 which is somewhat displaced from the center tap to maintain the bridge in balance, as discussed in detail in the application.

Figure 2A:
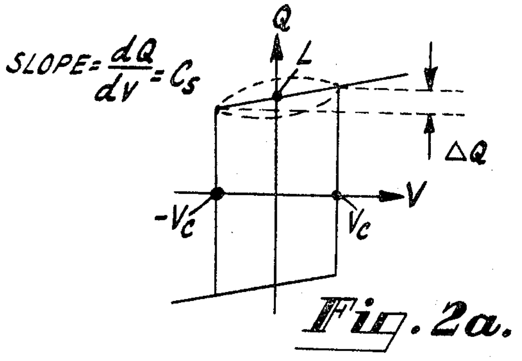
Figure 2B:
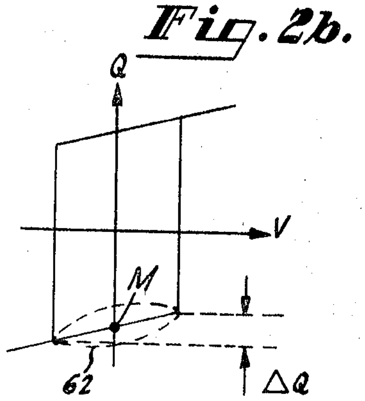

Somewhat idealized hysteresis loops for ferroelectric elements FE–1 and FE–2 appear in FIGURES 2*a* and 2*b*, respectively. Operating points L and M for the two ferroelectric elements, respectively, represent these elements polarized in opposite states and the transcharger therefore in a blocked condition. In this condition, the alternating voltage source drives the ferroelectric element FE–1 back and forth along the saturation region of its hysteresis loop, as indicated by dotted line 60 in FIGURE 2*a*. In a similar manner, the source 50 drives the ferroelectric element FE–2 along the lower saturation region of its hysteresis loop, as indicated by dotted line 62.

Since the hysteresis loops are not absolutely square, the saturation regions thereof just discussed are not absolutely parallel to the voltage axis. The slope of these regions is shown in the figures as $dQ/dV=C_s$, and the change in charge due to the alternating voltage is shown as $\Delta Q$. This charge $\Delta Q$ flows through the electroluminescent cell EL, and the voltage across the electroluminescent cell which results causes the cell to produce a light output of relatively low intensiy.

Figure 3:
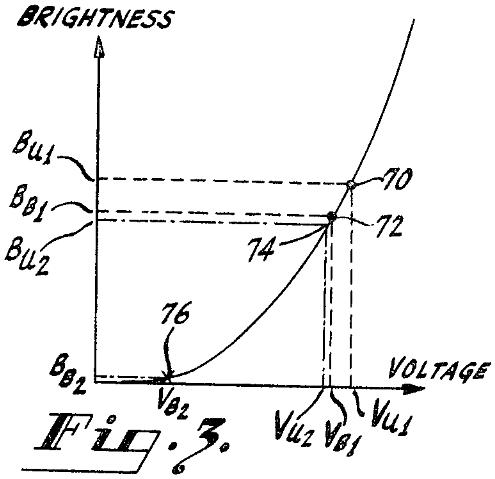
FIGURE 3 is a graph of voltage vs. brightness for an electroluminescent element.

The brightness B versus voltage V characteristic of a typical electroluminescent element appears in FIGURE 3. In the unblocked condition of the transcharger of FIGURE 1, the electroluminescent element may be at an operating point such as 70. Here a voltage $V_{U_1}$ develops across the electroluminescent element, and this results in a light output $B_{U_1}$. In the blocked condition of the transcharger the electroluminescent element may operate at a point such as 72. At this operating point, a voltage $V_{B_1}$ develops across the electroluminescent element, and this results in a light output $B_{B1}$. The resulting contrast ratio is $B_{U1}/B_{B1}$.

Figure 4:
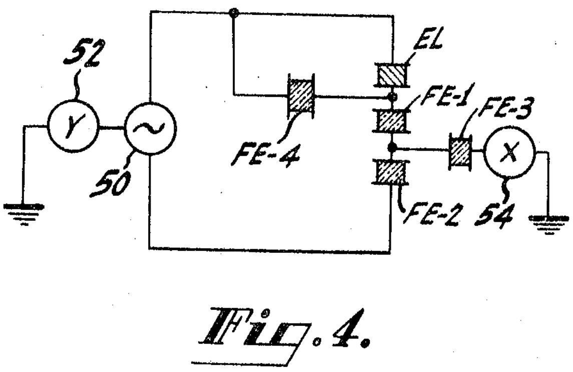
FIGURE 4 is a schematic circuit diagram of one embodiment of a new and improved transcharger circuit according to the invention.

The contrast ratio above is substantially improved with the circuit of the present invention shown in FIGURE 4. The transcharger circuit itself, as can be seen, is substantially identical with the one of FIGURE 1. However, a by-pass circuit consisting of a fourth ferroelectric element FE–4 is placed across the electroluminescent element. The element FE–4 has a substantially lower value of capacitance (a smaller area, for example) than the element FE–1 (the capacitance of FE–1 is equal to that of FE–2).

In the operation of the circuit of FIGURE 4, in the blocked condition of the transcharger, a certain amount of charge passes through ferroelectric elements FE–1 and FE–2 and tends to cause a voltage to develop across the electroluminescent element EL. This voltage tends to cause the electroluminescent element to light up. However, in response to this relatively small amount of charge, the ferroelectric element FE–4 exhibits a very low impedance—substantially lower than that exhibited by the electroluminescent EL. It is believed that this is due to the ferroelectric element FE–4 operating on a minor hysteresis loop surrounding the intersection of its charge-voltage axis (the hysteresis loop of element FE–4 is similar to that shown in FIG. 2 but the saturation regions occur at lower values of $\pm Q$).

When the transcharger elements FE–1 and FE–2 are placed in their unblocked condition, the substantial amount of charge which flows through these elements quickly drives the element FE–4 to saturation. In this condition the element FE–4 appears like a relatively high value of impedance, a substantial voltage develops across the element FE–4 and, since this element is in parallel with the electroluminescent cell, this same voltage develops across the latter. The electroluminescent element therefore lights up at a relatively high level of brightness (specific figures are given later).

It has been found, in practice, that the by-pass circuit is quite non-linear. In the blocked state of the transcharger, it acts like such a very low value of impedance compared to the load (EL) impedance that the electroluminescent element brightness drops from a very substantial value to practically zero. In the unblocked condition of the transcharger, a voltage develops across the now saturated ferroelectric element FE–4 which is only slightly less that which would develop across the electroluminescent cell, in the absence of FE–4. Therefore, the maximum brightness level is lowered a relatively small amount (about 12% in one practical circuit).

Figure 5:
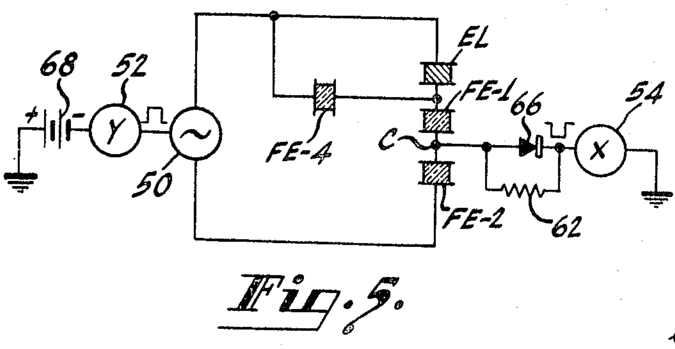
FIGURE 5 is a schematic circuit diagram of another embodiment of a transcharger circuit according to the invention.

The circuit of FIGURE 5 is a somewhat modified version of the circuit of FIGURE 4. A diode 66 shunted by a resistor 62 of relatively large value is employed rather than the third ferroelectric element FE–3. A reverse biasing source for the diode 66, shown as a battery 68, is also included in the circuit. This circuit has certain operational advantages but cannot be integrated as readily as the circuit of FIGURE 4.

In the operation of the circuit of FIGURE 5, the direct voltage source 68 normally reverse biases the diode 66. Therefore, the path from C through the diode 66 and X voltage source 54 is a relatively high impedance path and there is relatively little tendency for the source 50 very quickly to cause blocking or unblocking by current flow through this path.

The ferroelectric elements FE–1 and FE–2 may be placed in a blocked condition by applying a positive voltage pulse from the Y source 52 and negative voltage pulse from the X source 54. These coincident pulses are of sufficient amplitude to overcome the reverse bias imparted by battery 68 and to oppositely polarize the ferroelectric elements FE–1 and FE–2.

No reset voltage source is necessary in the circuit of FIGURE 5. Instead, the circuit parameters are so chosen that the alternating voltage source 50 switches the polarization of the ferroelecric elements FE–1 and FE–2 to the same direction within one "frame interval" (approximately thirty milliseconds). (A frame interval is the time required to scan an array containing perhaps rows and columns of transchargers. The way in which an array may be interconnected is shown, for example, in FIGURE 5 of the copending application above.) This switching of polarization occurs through resistor 62 which, as already mentioned, has a high value as, for example, 22 megohms. As an alternative, a poor diode 66, that is, a diode having a substantial leakage in the reverse direction, may be employed without the resistor 62.

A circuit such as shown in FIGURE 5, which has the following parameters, has been built:

Area of FE capacitor FE–1=FE–2=9025 mils$^2$;

Area of ferroelectric FE–4=4225 mils$^2$;

Frequency of sine wave produced by source 50=1 kilocycle;

Voltage produced by source 50=1.2 kilovolts peak-to-peak;

Voltage required to be applied directly across the particular electroluminescent element EL employed in the circuit to produce an output of 10 foot-lamberts when energized by a 400 cycle sine wave=125 volts R.M.S. (This is simply a measure of the relative performance of the electroluminescent element without regard to the present circuit.);

Area of the electroluminescent element=$\frac{1}{16}$ in.$^2$;

Voltage which develops across the element EL when the transcharger is blocked=96 volts peak-to-peak;

Voltage which develops across the element EL when the transcharger is unblocked=600 volts peak-to-peak;

Ferroelectric material employed for FE–1 and FE–2 and FE–4; a ceramic material having the composition $Pb_{0.99}[(Zr_{0.50}Sn_{0.50})_{0.86}Ti_{0.14}]_{0.98}Nb_{0.02}O_3$.

The light output obtained in the circuit above with the ferroelectric elements in the blocked state was 0.5 foot-lamberts (operating point 76 in FIG. 3) and with the ferroelectric elements in the unblocked state was 65 foot-lamberts (operating point 74 in FIG. 3). This is a contrast ratio $B_{U_2}/B_{B_2}$ of 130.

The same circuit was tested without ferroelectric element FE–4 but with all other elements the same. The maximum brightness obtained was 75 foot-lamberts and the minimum brightness 68 foot-lamberts, a contast ratio of only 1.1.

The important and significant improvement achieved with the circuit of the present application is self-evident from the figures above.

What is claimed is:

1. In combination:
an alternating voltage source;
two capacitor elements connected essentially in series with said source which are polarizable in the same direction to assume an unblocked condition in which they exhibit a relatively low impedance and in opposite directions to assume a blocked condition in which they exhibit a relatively high impedance;
means coupled to said two capacitor elements for switching them between their two conditions;
a load in circuit with said two capacitor elements and and voltage source which, in one condition of said elements, receives a relatively large voltage from said source and, in said other condition of said elements, receives a relatively low amplitude voltage from said source; and
means for reducing the effect of said relatively low amplitude voltage comprising a non-linear by-pass circuit in shunt with said load which exhibits a value of impedance substantially higher than that of the load in said one condition of said elements and a value of impedance substantially lower than that of said load in said other condition of said capacitor elements.

2. In combination:
an alternating voltage source;
two ferroelectric elements connected essentially in series with said source which are polarizable in the same direction to assume an unblocked condition in which they exhibit a relatively low impedance and in opposite directions to assume a blocked condition in which they exhibit a relatively high impedance;
means coupled to said two ferroelectric elements for switching them between their two conditions;
a load in circuit with said two ferroelectric elements and voltage source which, in one condition of said elements, receives a relatively large voltage from said source and, in said other condition of said elements, receives a relatively low amplitude voltage from said source; and
means for reducing the effect of said relatively low amplitude voltage comprising a non-linear by-pass circuit in shunt with said load which exhibits a value of impedance substantially higher than that of the load in said one condition of said elements and a value of impedance substantially lower than that of said load in said other condition of said ferroelectric elements.

3. In combination:
an alternating voltage source;
two ferroelectric elements connected essentially in series with said source which are polarizable in the same direction to assume an unblocked condition in which they exhibit a relatively low impedance and in opposite directions to assume a blocked condition in which they exhibit a relatively high impedance;
means coupled to said two ferroelectric elements for switching them between their two conditions;
a load in circuit with said two ferroelectric elements and voltage source which, in the unblocked condition of said elements, receives a relatively large voltage from said source and, in the blocked condition of said elements, receives a relatively low amplitude voltage from said source; and
means for reducing the effect of said relatively low amplitude voltage comprising means including a third ferroelectric element which has an area substantially smaller than that of either of the first two ferroelectric elements connected directly across said load.

4. In combination:
a load;
two ferroelectric elements connected essentially in series with said load which are polarizable in the same direction to assume an unblocked condition in which they exhibit a relatively low impedance and in opposite directions to assume a blocked condition in which they exhibit a relatively high impedance;
means coupled to said two ferroelectric elements for switching them between their two conditions;
an alternating voltage source connected across the circuit comprising said load and ferroelectric elements, which, in the unblocked condition of said elements, places a relatively large voltage across said load and, in the blocked condition of said elements, places a relatively low amplitude voltage across said load; and
means for reducing the effect of said relatively low amplitude voltage comprising a non-linear by-pass circuit in shunt with said load which exhibits a value of impedance substantially higher than that of the load in said one condition of said elements and a value of impedance substantially lower than that of said load in said other condition of said ferroelectric elements.

5. In combination:
an alternating voltage source;
two ferroelectric elements connected essentially in series with said source which are polarizable in the same direction to assume an unblocked condition in which they exhibit a relatively low impedance and in opposite directions to assume a blocked condition in which they exhibit a relatively high impedance;
means coupled to said two ferroelectric elements for switching them between their two conditions;
an electroluminescent cell in circuit with said two ferroelectric elements and voltage source which, in the unblocked condition of said elements, receives a relatively large voltage from said source and, in the blocked condition of said elements, receives a relatively low amplitude voltage from said source; and
means for reducing the effect of said relatively low amplitude voltage comprising a third ferroelectric element which has an area substantially smaller than that of either of the first two ferroelectric elements connected directly across said electroluminescent cell.

6. In combination:
an alternating voltage source;
two ferroelectric elements connected essentially in series with said source which are polarizable in the same direction to assume an unblocked condition in which they exhibit a relatively low impedance and in opposite directions to assume a blocked condition in which they exhibit a relatively high impedance;
means coupled to said two ferroelectric elements for switching them between their two conditions;
an electroluminescent cell in circuit with said two ferroelectric elements and voltage source which, in the unblocked condition of said elements, receives a relatively large voltage from said source and, in the blocked condition of said elements, receives a relatively low amplitude voltage from said source; and
means for reducing the effect of said relatively low amplitude voltage comprising a third ferroelectric element which has an area of approximately one-half that of either of the first two ferroelectric elements connected directly across said electroluminescent cell.

7. In combination:
an electroluminescent cell;

first and second ferroelectric elements connected essentially in series with said cell which are polarizable in the same direction to assume an unblocked condition in which they exhibit a relatively low impedance and in opposite directions to assume a blocked condition in which they exhibit a relatively high impedance;

means coupled to said two ferroelectric elements for switching them between their two conditions;

an alternating voltage source connected across the circuit comprising said electroluminescent cell and ferroelectric elements, which in the unblocked condition of said elements, places a relatively large voltage across said cell and, in the blocked condition of said elements, places a relatively low amplitude voltage across said cell; and means for reducing the effect of said relatively low amplitude voltage comprising a non-linear by-pass circuit in shunt with said electroluminescent cell, said circuit including a third ferroelectric element which has a smaller capacitance than either the first or second such elements and which has a value of impedance substantially lower than that of said electroluminescent cell, when said first and second ferroelectric elements are in their blocked condition, and substantially higher than said electroluminescent cell when the first and second ferroelectric elements are in their unblocked condition.

8. In combination:

an alternating voltage source;

two capacitor elements connected essentially in series with said source which are polarizable in the same direction to assume an unblocked condition in which they exhibit a relatively low impedance and in opposite directions to assume a blocked condition in which they exhibit a relatively high impedance;

means coupled to said two ferroelectric elements for switching them between their two conditions;

an electroluminescent cell in circuit with said two capacitor elements and voltage source which, in one condition of said elements, receives a relatively large voltage from the source and, in said other condition of said elements, receives a relatively low amplitude voltage from said source; and means for reducing the effect of said relatively low amplitude voltage comprising a non-linear by-pass circuit in shunt with said cell which exhibits a value of impedance substantially higher than that of the load in said one condition of said elements and a value of impedance substantially lower than that of said cell in said other condition of said capacitor elements.

References Cited

UNITED STATES PATENTS

| | | | |
|---|---|---|---|
| 3,189,746 | 6/1965 | Slobodin et al. | 250—216 |
| 3,227,034 | 1/1966 | Shelton | 340—146.3 X |
| 3,246,295 | 4/1966 | De Claiis et al. | 340—146.3 |
| 3,255,436 | 6/1966 | Gamba | 250—237 X |
| 3,292,148 | 12/1966 | Gioliano et al. | 340—146.3 |

JOHN W. HUCKERT, Primary Examiner

JERRY D. CRAIG, Assistant Examiner

U.S. Cl. X.R.

340—173.2